(12) United States Patent
Inukai

(10) Patent No.: US 9,209,621 B2
(45) Date of Patent: Dec. 8, 2015

(54) POWER SUPPLY SYSTEM

(71) Applicant: Katsumi Inukai, Iwakura (JP)

(72) Inventor: Katsumi Inukai, Iwakura (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 83 days.

(21) Appl. No.: 14/169,933

(22) Filed: Jan. 31, 2014

(65) Prior Publication Data

US 2014/0218827 A1 Aug. 7, 2014

(30) Foreign Application Priority Data

Feb. 1, 2013 (JP) ................................. 2013-018217

(51) Int. Cl.
*H02H 3/20* (2006.01)
*H02H 11/00* (2006.01)
*H02H 7/122* (2006.01)
*H02H 7/125* (2006.01)
*H02H 7/12* (2006.01)
*H02H 9/04* (2006.01)

(52) U.S. Cl.
CPC .......... *H02H 11/006* (2013.01); *H02H 7/1213* (2013.01); *H02H 7/1227* (2013.01); *H02H 7/1252* (2013.01); *H02H 9/04* (2013.01)

(58) Field of Classification Search
USPC ....................................... 361/18, 86–87, 91.1
See application file for complete search history.

(56) References Cited

U.S. PATENT DOCUMENTS

| | | |
|---|---|---|
| 4,910,654 A | 3/1990 | Forge |
| 5,032,968 A | 7/1991 | Mikami et al. |
| 5,231,309 A | 7/1993 | Soma et al. |
| 5,659,371 A | 8/1997 | Krause |
| 5,914,538 A | 6/1999 | Kurosawa et al. |
| 6,115,266 A | 9/2000 | Matsui et al. |
| 6,353,543 B2 | 3/2002 | Itoh et al. |
| 6,408,148 B1 | 6/2002 | Yamamoto |
| 6,476,589 B2 | 11/2002 | Umminger et al. |

(Continued)

FOREIGN PATENT DOCUMENTS

| | | |
|---|---|---|
| JP | 62-064256 A | 3/1987 |
| JP | 2-250670 A | 10/1990 |

(Continued)

OTHER PUBLICATIONS

Office Action issued in related Japanese patent application No. 2011-245775, Jan. 20, 2015 with partial English-language translation): 10 pages.

(Continued)

*Primary Examiner* — Danny Nguyen
(74) *Attorney, Agent, or Firm* — Merchant & Gould PC

(57) ABSTRACT

A power supply system includes: a switching power supply; a switching unit for switching a connection state between an AC power supply and the switching power supply; an electricity storage unit; an auxiliary power supply circuit for feeding charging current to the electricity storage unit; a driving circuit for driving the switching unit; a voltage detection circuit for detecting a voltage of the AC power supply; and a control device configured to perform: an overvoltage detection process of determining whether the AC power supply is an overvoltage based on a detection value of the voltage detection circuit; and a process of, in a case where an overvoltage is detected, keeping the switching unit at a cutoff state where the alternating current power supply and the switching power supply are disconnected.

7 Claims, 13 Drawing Sheets

(56) References Cited

U.S. PATENT DOCUMENTS

| | | |
|---|---|---|
| 7,602,158 B1 | 10/2009 | Iacob |
| 7,639,963 B2 | 12/2009 | Matsuo |
| 8,503,900 B2 | 8/2013 | Inukai |
| 2004/0190923 A1 | 9/2004 | Inukai |
| 2008/0309163 A1 | 12/2008 | Hashimoto et al. |
| 2009/0060558 A1 | 3/2009 | Uehara |
| 2009/0128347 A1* | 5/2009 | Bucella et al. ............ 340/654 |
| 2009/0168461 A1 | 7/2009 | Nakahori |
| 2009/0180229 A1* | 7/2009 | Lee ....................... 361/91.1 |
| 2009/0230781 A1 | 9/2009 | Hung et al. |
| 2010/0122096 A1 | 5/2010 | Ozenc |
| 2010/0256897 A1 | 10/2010 | Takata et al. |
| 2011/0063759 A1 | 3/2011 | Billingsley et al. |
| 2011/0110129 A1 | 5/2011 | Busch |
| 2012/0025630 A1 | 2/2012 | Tsuda |
| 2012/0060786 A1 | 3/2012 | Okada et al. |
| 2012/0148273 A1 | 6/2012 | Shimura et al. |
| 2012/0206057 A1 | 8/2012 | Kim et al. |
| 2013/0028623 A1 | 1/2013 | Inukai |
| 2013/0031396 A1 | 1/2013 | Inukai |
| 2013/0038318 A1 | 2/2013 | Inukai |
| 2013/0111237 A1 | 5/2013 | Inukai |
| 2013/0113292 A1 | 5/2013 | Inukai |
| 2013/0129373 A1 | 5/2013 | Inukai |
| 2014/0210264 A1 | 7/2014 | Inukai |
| 2014/0218981 A1 | 8/2014 | Harada |
| 2014/0233266 A1 | 8/2014 | Inukai |

FOREIGN PATENT DOCUMENTS

| | | |
|---|---|---|
| JP | 4-14486 U | 2/1992 |
| JP | 4-51260 A | 2/1992 |
| JP | 7-87734 H | 3/1995 |
| JP | 7-308065 H | 11/1995 |
| JP | 9-23638 H | 1/1997 |
| JP | 2001-005350 A | 1/2001 |
| JP | 2001-025163 A | 1/2001 |
| JP | 2004-151998 A | 5/2004 |
| JP | 2004-187391 A | 7/2004 |
| JP | 2004-274887 A | 9/2004 |
| JP | 2004-303469 A | 10/2004 |
| JP | 2006-129651 A | 5/2006 |
| JP | 2010-172149 A | 8/2010 |
| JP | 2010-239774 A | 10/2010 |
| JP | 2010-252574 A | 11/2010 |
| JP | 2011-120366 A | 6/2011 |
| JP | 2011-125132 A | 6/2011 |
| JP | 2011-199976 | 10/2011 |
| JP | 2011-212951 A | 10/2011 |
| JP | 2013-102650 A | 5/2013 |
| WO | 97-50165 A1 | 12/1997 |

OTHER PUBLICATIONS

Office Action issued in corresponding U.S. Appl. No. 14/171,877, mailed Mar. 31, 2015.

U.S. Office Action (Notice of Allowance) issued in related application U.S. Appl. No. 14/169,487, Aug. 17, 2015.

U.S. Office Action issued in related application U.S. Appl. No. 13/629,511, mailed Jun. 19, 2015.

* cited by examiner

FIG. 8

| | POWER SUPPLY FREQUENCY OF AC POWER SUPPLY | WHETHER OR NOT FRAME GROUND | FREQUENCY OF PULSE SIGNAL Sp | FREQUENCY RATIO | PEAK VOLTAGE Vp AT THE NORMAL STATE (POWER SUPPLY VOLTAGE 100V) | THRESHOLD |
|---|---|---|---|---|---|---|
| CONDITION A | 50Hz | NO FRAME GROUND (FULL WAVE) | 100Hz | DOUBLE | 0.9 | 1.5 |
| CONDITION B | 60Hz | NO FRAME GROUND (FULL WAVE) | 120Hz | DOUBLE | 1.1 | 1.6 |
| CONDITION C | 50Hz | FRAME GROUND (HALF WAVE) | 50Hz | ONE | 1.8 | 3 |
| CONDITION D | 60Hz | FRAME GROUND (HALF WAVE) | 60Hz | ONE | 2.2 | 3.2 |

POWER SUPPLY SYSTEM

CROSS-REFERENCE TO RELATED APPLICATIONS

This application claims priority from Japanese Patent Application No. 2013-018217 filed on Feb. 1, 2013, the entire subject-matter of which is incorporated herein by reference.

TECHNICAL FIELD

The invention relates to a technology of protecting a switching power supply from an overvoltage.

BACKGROUND

There has been disclosed a technology of detecting an overvoltage of an AC input to thus cut off an AC line, thereby protecting an electronic component such as a smoothing capacitor provided at a primary side of a switching power supply.

SUMMARY

Illustrative aspects of the invention provide a technology for protecting a switching power supply from an overvoltage.

According to one illustrative aspect of the invention, there is provided A power supply system comprising: a switching power supply configured to convert an alternating current voltage from an alternating current power supply into a predetermined direct current voltage and to output the direct current voltage; a switching unit, which is provided between the alternating current power supply and the switching power supply, and which is configured to switch a connection state between the alternating current power supply and the switching power supply; a control device; an electricity storage unit configured to feed power to the control device in a case where the switching power supply is at a stop; an auxiliary power supply circuit, which is connected in parallel with the switching power supply with respect to the alternating current power supply, and which is configured to feed charging current to the electricity storage unit; a driving circuit configured to drive the switching unit in response to an instruction output from the control device; and a voltage detection circuit configured to detect a voltage of the alternating current power supply. The control device may be configured to perform: an overvoltage detection process of, when starting up the switching power supply, determining whether the alternating current power supply is an overvoltage based on a detection value of the voltage detection circuit; and a process of, in a case where an overvoltage is detected in the overvoltage detection process, keeping the switching unit at a cutoff state where the alternating current power supply and the switching power supply are disconnected.

BRIEF DESCRIPTION OF THE DRAWINGS

FIG. 8 is a table showing a relation between a frequency of the pulse signal Sp and a threshold;

DETAILED DESCRIPTION

General Overview

Figure 1:
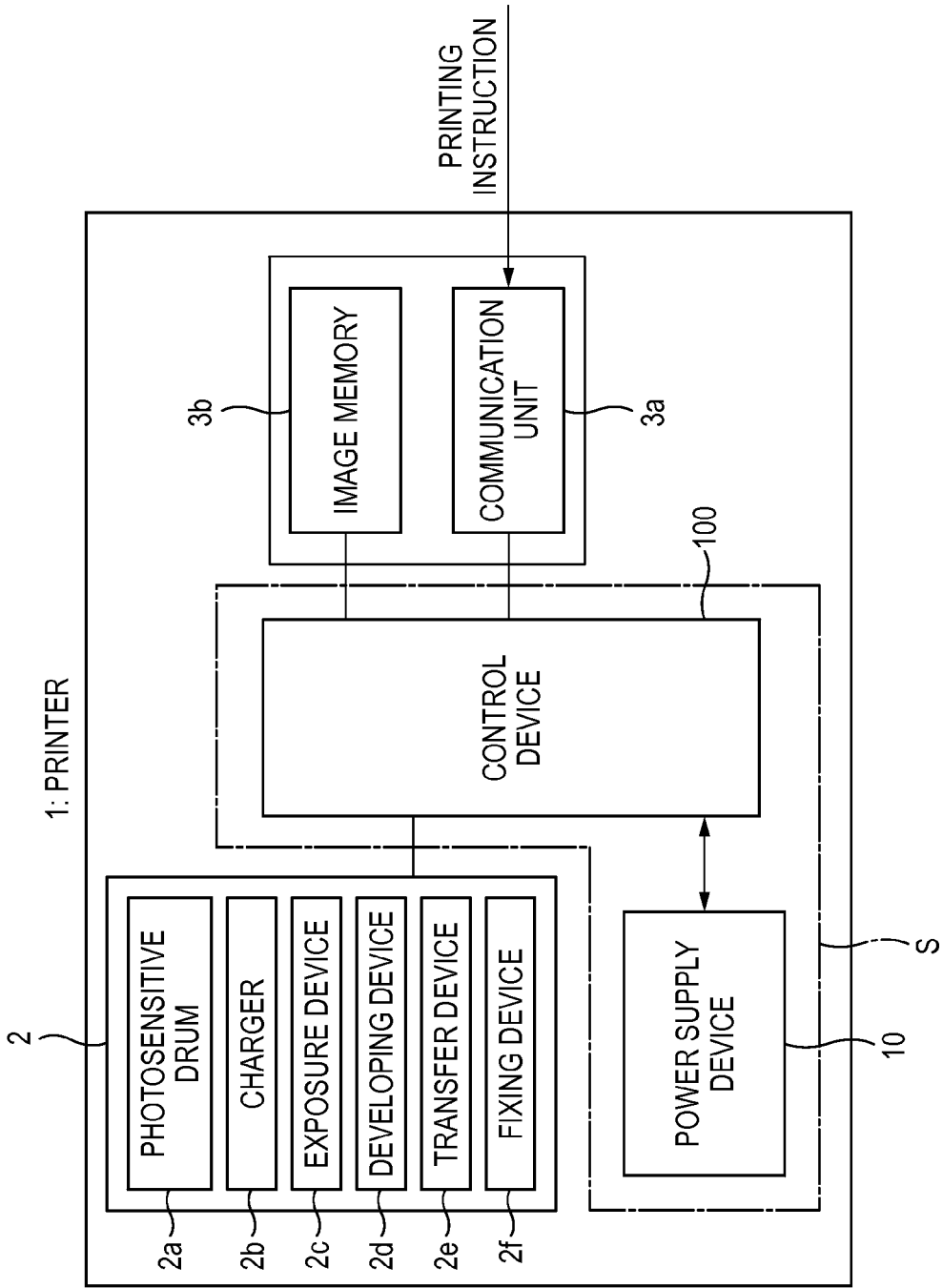
FIG. 1 is a block diagram showing an electrical configuration of a printer according to a first illustrative embodiment.

The above-described related-art technology has some disadvantages. For example, according to the above-described related-art technology, it is not possible to detect the overvoltage until an AC input to a power supply circuit, which is a protection target, is made. Hence, when a large overvoltage is generated, the detection thereof may be delayed and the smoothing capacitor may not be protected, so that a specific measure is needed.

Therefore, illustrative aspects of the invention provide a technology for protecting a switching power supply from an overvoltage.

According to one illustrative aspect of the invention, there is provided A power supply system comprising: a switching power supply configured to convert an alternating current voltage from an alternating current power supply into a predetermined direct current voltage and to output the direct current voltage; a switching unit, which is provided between the alternating current power supply and the switching power supply, and which is configured to switch a connection state between the alternating current power supply and the switching power supply; a control device; an electricity storage unit configured to feed power to the control device in a case where the switching power supply is at a stop; an auxiliary power supply circuit, which is connected in parallel with the switching power supply with respect to the alternating current power supply, and which is configured to feed charging current to the electricity storage unit; a driving circuit configured to drive the switching unit in response to an instruction output from the control device; and a voltage detection circuit configured to detect a voltage of the alternating current power supply. The control device may be configured to perform: an overvoltage detection process of, when starting up the switching power supply, determining whether the alternating current power supply is an overvoltage based on a detection value of the voltage detection circuit; and a process of, in a case where an overvoltage is detected in the overvoltage detection process, keeping the switching unit at a cutoff state where the alternating current power supply and the switching power supply are disconnected.

In the above configuration, when an overvoltage of the alternating current power supply is detected, the alternating current power supply and the switching power supply are kept at a disconnected state. For this reason, the overvoltage is not applied to the switching power supply, so that the switching power supply can be protected from the overvoltage.

Regarding illustrative embodiments of the power supply system, following configurations are preferable.

In a case where the overvoltage is not detected while the process of keeping the switching unit at the cutoff state is being executed, the control device is configured to control the driving circuit to switch the switching unit to a connection state where the alternating current power supply and the switching power supply are connected.

According thereto, in a case where the overvoltage is not detected, it is possible to automatically start up the switching power supply.

The auxiliary power supply circuit may comprise: a pair of coupling capacitors; and a bridge-type rectification circuit, which is connected to the alternating current power supply through the pair of coupling capacitors, and which is configured to rectify the alternating current voltage from the alternating current power supply. The auxiliary power supply circuit may be configured to supply current, which is output from the bridge-type rectification circuit, to the electricity storage unit as the charging current. The voltage detection circuit may comprise: a detection resistance that generates a voltage corresponding to the current output from the bridge-type rectification circuit; and a detection circuit configured to detect a voltage between both ends of the detection resistance. The control device may be configured to compare the voltage between both ends of the detection resistance, which is detected by the detection circuit, and a threshold so as to determine whether the alternating current power supply is an overvoltage.

According thereto, it is possible to configure the auxiliary power supply circuit and the voltage detection circuit with relatively simple circuits.

The power supply system may further comprise a pulse signal output circuit configured to output a pulse signal having a frequency corresponding to a power supply frequency of the alternating current power supply. The control device may be configured to change a value of the threshold based on the frequency of the pulse signal.

A magnitude of the current flowing through the detection resistance is changed depending on the power supply frequency of the alternating current power supply. In this illustrative embodiment, since the threshold is changed depending on the power supply frequency of the alternating current power supply, it is possible to correctly determine whether the alternating current power supply is an overvoltage, irrespective of the power supply frequency.

The pulse signal output circuit may comprise a switching element configured to, by being switched an on/off state thereof depending on a value of the current output from the bridge-type rectification circuit, output the pulse signal having the frequency corresponding to the power supply frequency of the alternating current power supply. The control device may be configured to change the value of the threshold based on comparison of the frequency of the pulse signal and the power supply frequency.

The magnitude of the current flowing through the detection resistance is changed depending on whether there is a frame ground. In this illustrative embodiment, considering that a ratio of the frequency of the pulse signal and the power supply frequency is changed depending on whether there is a frame ground, the threshold is changed depending on the ratio of the frequency of the pulse signal and the power supply frequency. For this reason, it is possible to correctly determine whether the alternating current power supply is an overvoltage, irrespective of whether there is a frame ground.

The detection circuit may comprise a peak hold circuit and may be configured to detect a peak value of the voltage between both ends of the detection resistance.

According thereto, compared to a configuration of calculating an average, it is possible to detect the voltage between both ends of the detection resistance in a short time.

The detection circuit may comprise an averaging circuit and may be configured to detect an average value of the voltage between both ends of the detection resistance.

According thereto, influences of noise during the detection can be suppressed, so that it is possible to correctly detect the voltage between both ends of the detection resistance.

According to the invention, it is possible to protect a switching power supply from an overvoltage.

ILLUSTRATIVE EMBODIMENTS

First Illustrative Embodiment

A first illustrative embodiment of the invention will be described with reference to FIGS. 1 to 13.

1. Printer

FIG. 1 is a block diagram showing an electrical configuration of a printer (which is an example of the 'image forming apparatus') 1. The printer 1 has a printing unit 2, a communication unit 3a, an image memory 3b and a power supply system S. The power supply system S has a power supply device 10 and a control device 100. The power supply device 10 is a power supply of the printer 1 and feeds power to the printing unit 2, the communication unit 3a, the image memory 3b and the control device 100.

The printing unit 2 has a photosensitive drum 2a, a charger 2b that executes a charging process of charging a surface of the photosensitive drum 2a, an exposure device 2c that executes an exposing process of forming an electrostatic latent image on the surface of the photosensitive drum 2a, a developing device 2d that executes a developing process of attaching developer on the electrostatic latent image formed on the surface of the photosensitive drum 2a to thereby form a developer image, a transfer device 2e that executes a transfer process of transferring the developer image to a recording medium and a fixing device 2f that executes a fixing process of fixing the developer image transferred onto the recording medium.

The printing unit 2 executes the charging process, the exposing process, the developing process, the transfer process and the fixing process, thereby executing a printing process of printing print data on the recording medium. The communication unit 3a performs communication with an information terminal apparatus such as a PC and receives a printing instruction or print data from the information terminal apparatus. The image memory 3b temporarily stores therein the print data received from the information terminal apparatus.

When the communication unit 3a receives a printing instruction and print data from the information terminal apparatus, the control device 100 of the printer 1 enables the printing unit 2 to execute the printing process consisting of the charging process, the exposing process, the developing process, the transfer process and the fixing process, thereby printing the print data on the recording medium. Incidentally, while an operating voltage of the printing unit 2 is 24V, operating voltages of the communication unit 3a, the image memory 3b and the control device 100 are 3.3V.

2. Circuits of Power Supply System

First, a configuration of the power supply device 10 of the power supply system S is described with reference to FIGS. 2 and 3. The power supply device 10 has a switching power supply 20, a backup capacitor CB that feeds power to the control device 100 when the switching power supply 20 is at a stop, an auxiliary power supply circuit 50, a relay 40, a pulse signal output circuit 60, a voltage detection circuit 70 and a relay driving circuit 80. Incidentally, the relay 40 is an example of the 'switching unit' of the invention and the relay driving circuit 80 is an example of the 'driving circuit' of the invention. Also, the backup capacitor CB is an example of the 'electricity storage unit' of the invention.

Figure 2:
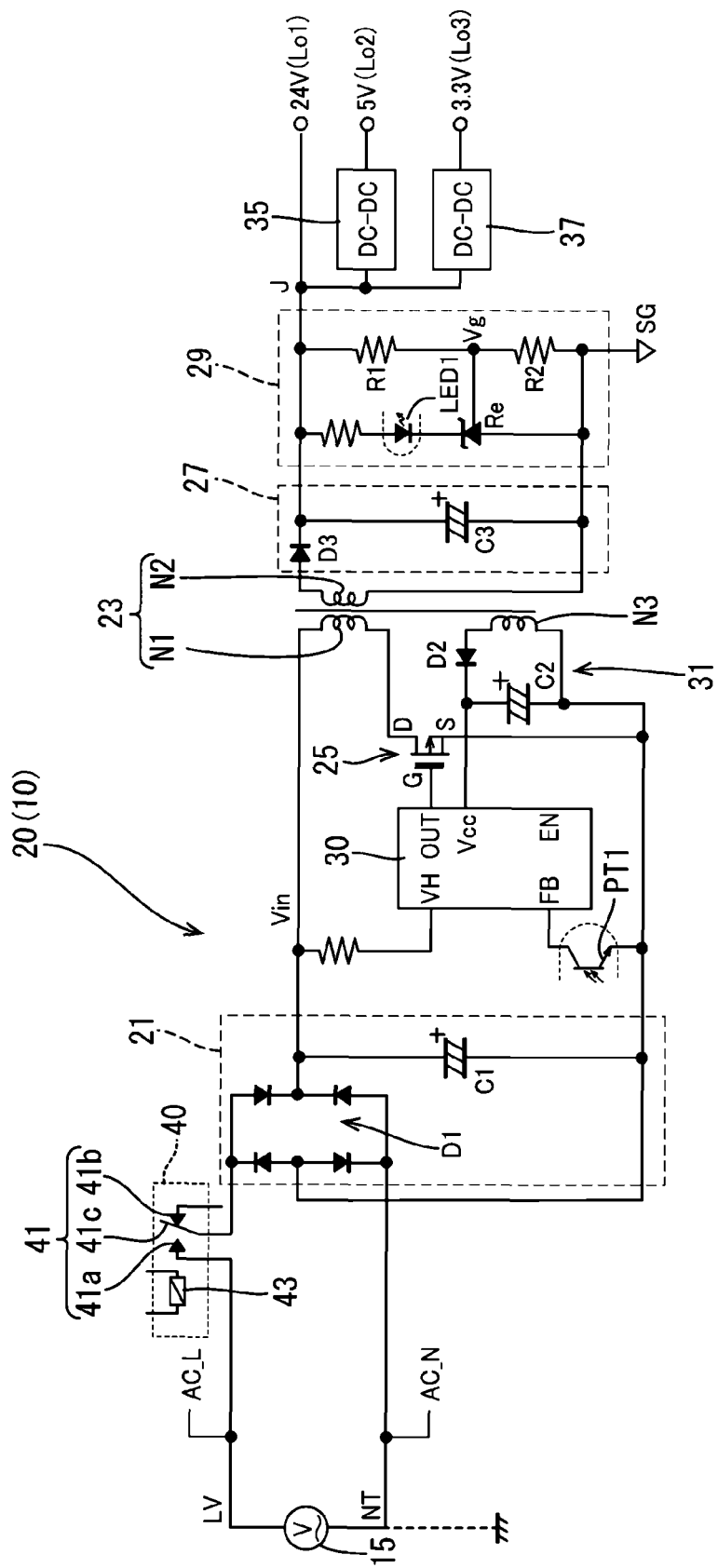
FIG. 2 is a circuit diagram of a power supply device, which shows a switching power supply-side.

FIG. 2 is a circuit diagram showing a configuration of the switching power supply 20-side of the power supply system S. The switching power supply 20 has a rectification smoothing circuit 21, a transformer 23, an FET (Field Effect Transistor) 25, a rectification smoothing circuit 27, a voltage detection circuit 29 and a control IC 30 that switching-controls the FET 25, and converts and outputs an alternating current (AC) voltage, which is input from an AC power supply 15, into a predetermined direct current (DC) voltage.

The rectification smoothing circuit 21 is a so-called capacitor input type and has a bridge diode D1 that rectifies the AC voltage from the AC power supply 15 and a capacitor C1 that smoothes the rectified voltage. The transformer 23 is provided at an output-side of the rectification smoothing circuit 21 and an input voltage Vin, which is obtained by rectifying and smoothing the AC voltage, is applied to a primary coil N1 of the transformer 23.

The FET 25 is an N-channel MOSFET and has a drain D, which is connected to the primary coil N1, and a source S, which is connected to a reference potential of the primary-side. As an on/off signal (PWM signal) is applied to a gate G from an output port OUT of the control IC 30, the FET 25 becomes on/off at a predetermined period. Thereby, the primary-side of the transformer 23 oscillates, so that a voltage is induced to a secondary coil N2 of the transformer 23.

Also, the primary-side of the transformer 23 is provided with a voltage generation circuit 31. The voltage generation circuit 31 rectifies and smoothes a voltage, which is induced to an auxiliary coil N3 provided at the primary-side of the transformer 23, by a diode D2 and a capacitor C2. The voltage generation circuit 31 becomes a power supply (about 20V) of the control IC 30.

The rectification smoothing circuit 27 is provided at a secondary-side of the transformer 23 and has a diode D3 and a capacitor C3. The rectification smoothing circuit 27 rectifies and smoothes a voltage that is induced to the secondary coil N2 of the transformer 23. Thereby, the switching power supply 20 outputs a voltage of DC 24V through an output line Lo1.

As shown in FIG. 2, the output line Lo1 is branched into three lines at a branch point J, and the respective branched lines are provided with DC-DC converters 35, 37, respectively. The DC-DC converter 35 drops an output voltage Vo1 of the switching power supply 20 to 5V and outputs the same from an output line Lo2. Also, the DC-DC converter 37 drops the output voltage Vo1 of the switching power supply 20 to 3.3V and outputs the same from an output line Lo3. Like this, the switching power supply 20 is configured to output the three voltages of 24V/5V/3.3V.

Also, the voltage detection circuit 29 is provided between the rectification smoothing circuit 27 and the branch point J of the output line. The voltage detection circuit 29 detects a level of the output voltage Vo1 (DC 24V) of the switching power supply 20 and has a pair of detection resistances R1, R2, a shunt regulator Re and a light emitting diode LED1 serially connected to the shunt regulator Re.

The detection resistances R1, R2 are provided between the output line Lo1 and a reference potential SG (signal ground) of the secondary-side and detect a divided voltage Vg that is obtained by dividing the output voltage Vo1 by a resistance ratio. The shunt regulator Re enables the current to flow in accordance with a level difference between a reference voltage in the shunt regulator Re and the divided voltage Vg. Thereby, the current is enabled to flow through the light emitting diode LED1 and the light emitting diode LED1 outputs a light signal having a light quantity corresponding to the level difference between the reference voltage and the divided voltage Vg.

The light emitting diode LED1 configures a photo-coupler together with a photo transistor PT1 connected to a feedback port FB of the control IC 30. For this reason, the light signal of the light emitting diode LED1 is returned at the photo transistor PT1, as an electric signal. Thereby, a signal (hereinafter, referred to as a feedback signal), which indicates the level difference between the reference voltage in the shunt regulator Re and the divided voltage Vg, is input (fed back) to the feedback port FB of the control IC 30.

As shown in FIG. 2, the control IC 30 has a power supply port VCC that is connected to the voltage generation circuit 31, a high voltage input port VH that is connected to a power supply line through a resistance, the feedback port FB to which the feedback signal is input, an output port OUT that outputs an on/off signal (PWM signal) and an EN port to which a control signal is input.

The control IC 30 has a PWM comparator and an oscillation circuit (not shown) that oscillates a triangular wave. When the feedback signal is input to the feedback port FB, the control IC 30 generates a PWM signal in accordance with the feedback signal and outputs the same to the gage G of the FET 25 through the output port OUT. Thereby, the output voltage VO1 of the switching power supply 20 is controlled to be a target voltage. In addition to this, the control IC 30 stops and resumes the switching control (the on/off control) of the FET 25, in response to the control signal output from the control device 100, which will be described later.

Also, as shown in FIG. 2, the relay 40 is provided between the AC power supply 15 and the switching power supply 20. Specifically, the relay 40 is provided on a line of a live LV-side of a pair of power supply lines, i.e., two lines of the live LV-side and a neutral NT-side connecting the AC power supply 15 and the switching power supply 20. Incidentally, the live LV-side means a non-ground-side and the neutral NT-side means a ground-side.

The relay 40 has a transfer contact point 41 and a driving coil 43 that performs a switching of the transfer contact point 41. The transfer contact point 41 has two fixed contact points 41a, 41b and a moveable contact point 41c and switches a connection state between the AC power supply 15 and the switching power supply 20. That is, while the moveable contact point 41c is connected to the switching power supply 20, the fixed contact point 41a is connected to the AC power supply 15 and the fixed contact point 41b is not connected.

For this reason, when the driving coil 43 is energized in a forward direction (an A direction shown in FIG. 3) to thus close the fixed contact point 41a, the power supply line of the live LV-side is closed, so that the switching power supply 20 is connected to the AC power supply 15. On the other hand, when the driving coil 43 is energized in a reverse direction (a B direction shown in FIG. 3) to thus close the fixed contact point 41b, the power supply line of the live LV-side is opened, so that the switching power supply 20 is disconnected from the AC power supply 15. Incidentally, the driving coils 43 shown in FIGS. 2 and 3 are the same.

Figure 3:
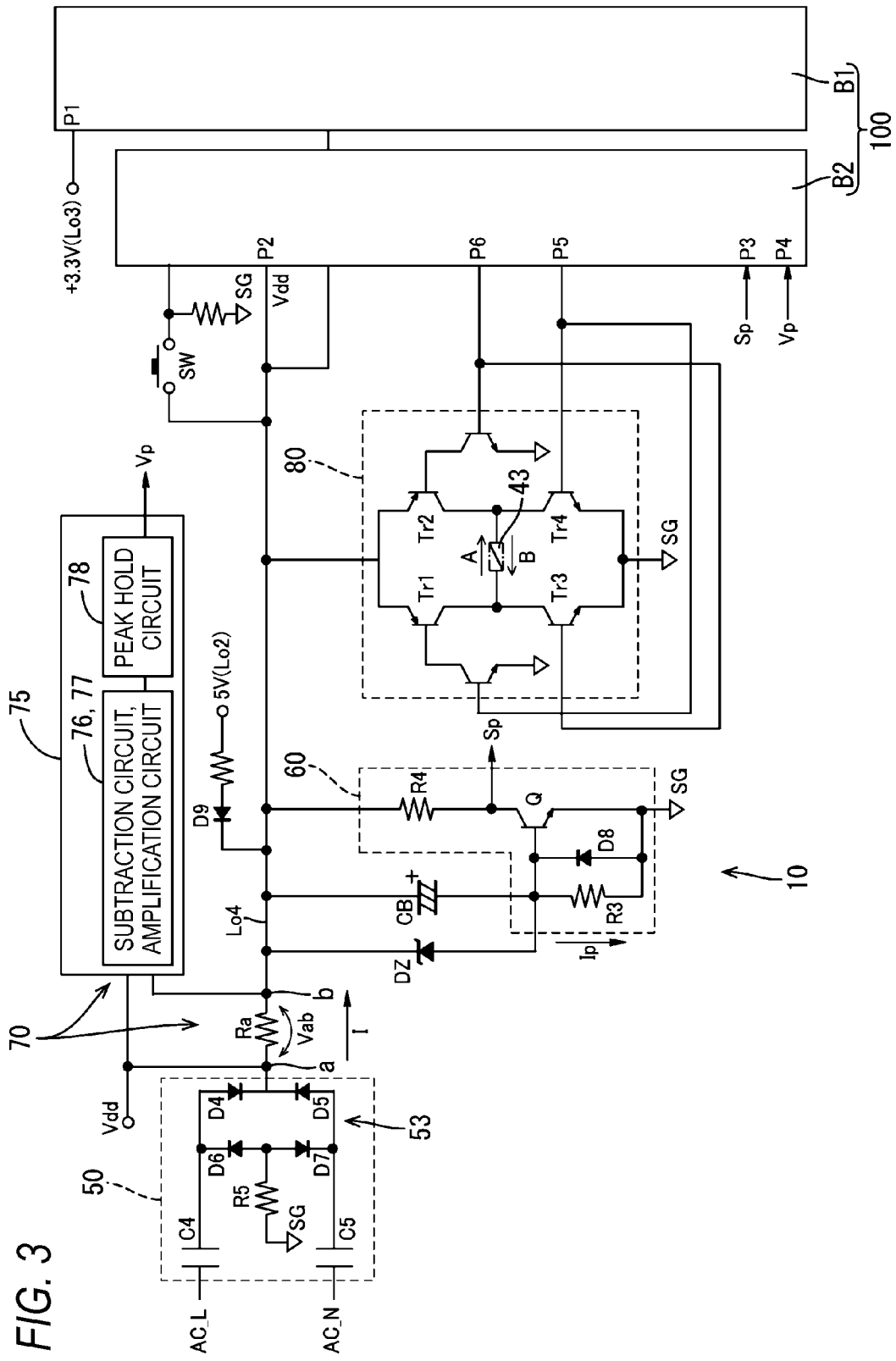
FIG. 3 is a circuit diagram of the power supply device, which shows an auxiliary power supply circuit-side.
Figure 4:
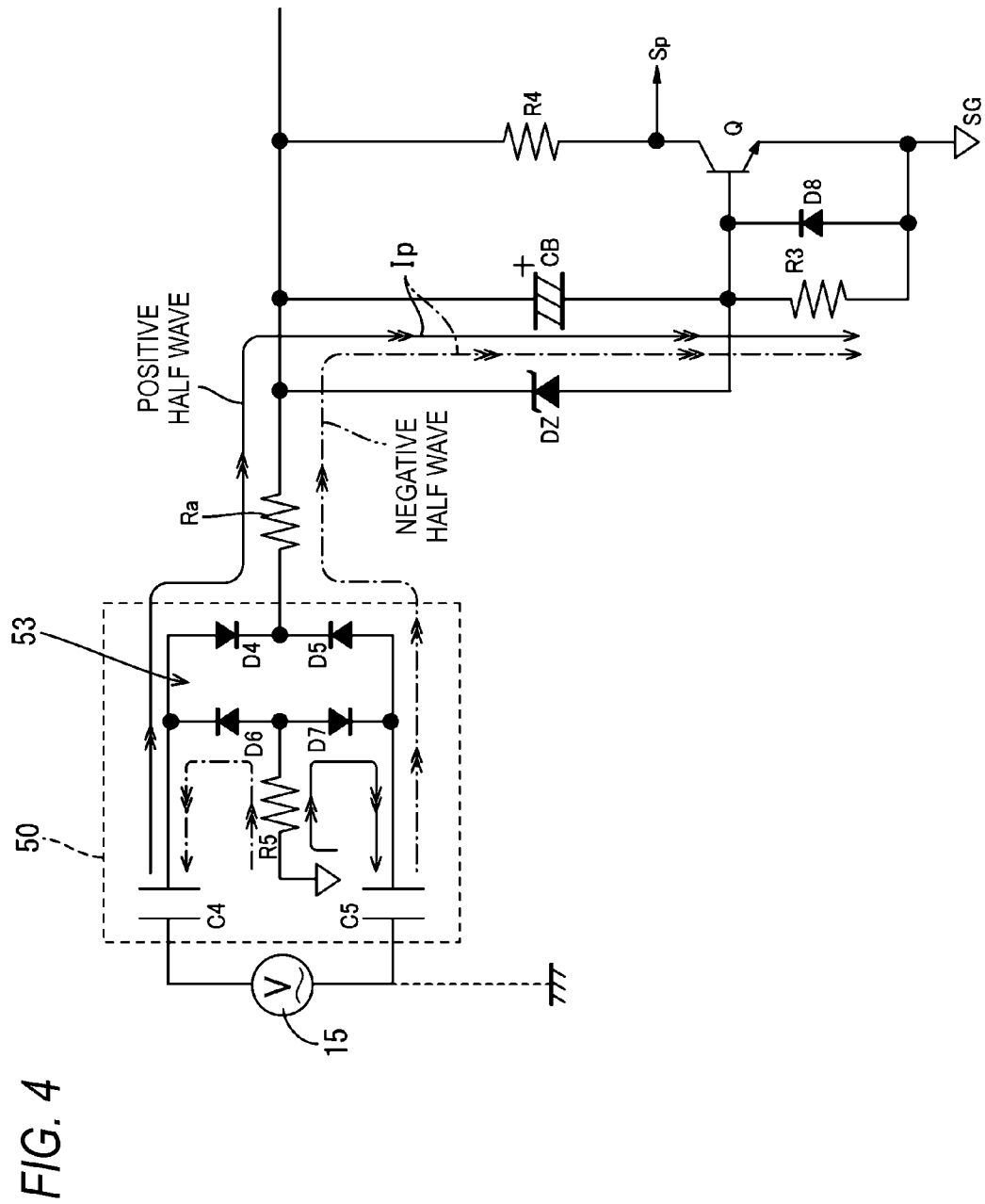
FIG. 4 is a circuit diagram showing a current path of current Ip when there is no frame ground.

FIG. 3 is a circuit diagram of the auxiliary power supply circuit 50, the pulse signal output circuit 60, the voltage detection circuit 70 and the relay driving circuit 80 in the power supply system S. The auxiliary power supply circuit 50 is a circuit that is connected in parallel with the switching power supply 20 with respect to the AC power supply 15 and feeds charging current to the backup capacitor CB.

Specifically, the auxiliary power supply circuit 50 has coupling capacitors C4, C5 and a bridge-type rectification circuit 53. The coupling capacitor C4 is connected to a power supply line AC_L of the live LV-side of the pair of power supply lines drawn out from the AC power supply 15 and the coupling capacitor C5 is connected to a power supply line AC_N of the neutral NT-side.

The rectification circuit 53 is a bridge diode (four bridge-connected diodes D4 to D7), is connected to the AC power supply 15 via the coupling capacitors C4, C5 and rectifies the AC voltage from the AC power supply 15. Among the bridge diodes, a connection point of the diode D6 and the diode D7 is connected to the reference potential SG of the secondary-side through a resistance R5. An output line Lo4 is drawn out from a connection point of the diode D4 and the diode D5. The backup capacitor CB is connected to the output line Lo4 of the rectification circuit 53 and the current rectified by the rectification circuit 53 is supplied to the backup capacitor CB, as the charging current. In this way, since the charging current is supplied to the backup capacitor CB from the auxiliary power supply circuit 50, the backup capacitor CB is charged even when the switching power supply 20 is at a stop. Also, the backup capacitor CB is connected to the output line Lo2 of 5V through a diode D9 and is also charged from the switching power supply 20-side while the switching power supply 20 is operating. Incidentally, the other end of the backup capacitor CB is connected to the reference potential SG (signal ground) of the secondary-side through a resistance R3. Also, the backup capacitor CB is connected in parallel with a zener diode Dz, so that it stabilizes the charging voltage.

The pulse signal output circuit 60 is a circuit that outputs a pulse signal Sp having a frequency corresponding to a power supply frequency of the AC power supply 15 and has the resistance R3, a transistor Q, a resistance R4 and a diode D8. The transistor Q is an NPN transistor of which an emitter is connected to the reference potential SG of the secondary-side and a collector is connected to the output line Lo4 through the resistance R4. A base is connected to a connection point of the backup capacitor CB and the resistance R3. Also, the diode D8 has an anode that is connected to the emitter of the transistor Q and a cathode that is connected to the base of the transistor Q. Incidentally, the transistor Q is an example of the 'switching element' of the invention.

Figure 5:
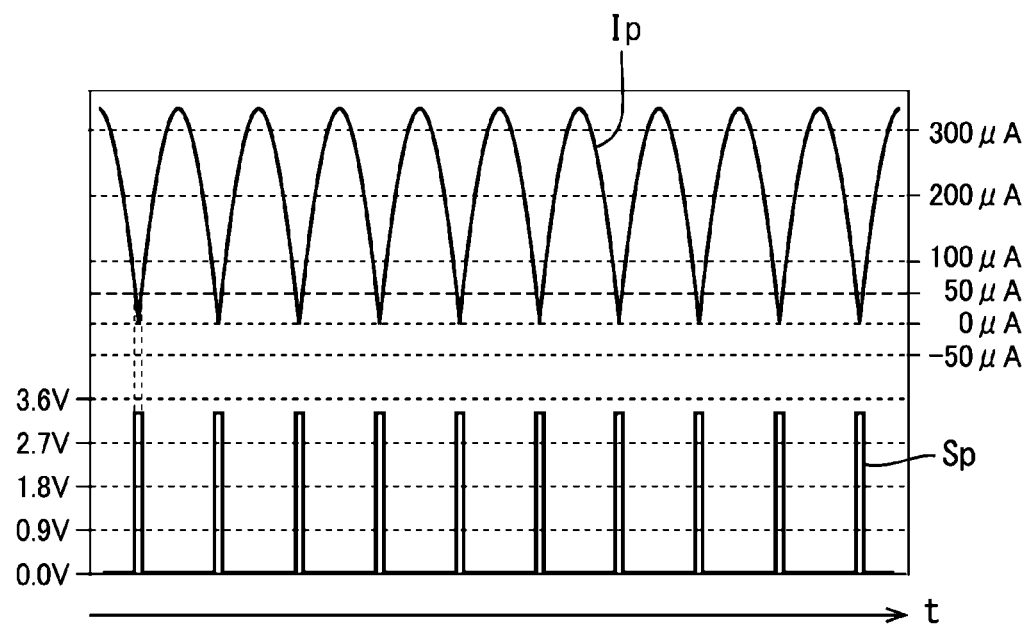
FIG. 5 shows waveforms of the current IP and a pulse signal Sp when there is no frame ground.
Figure 6:
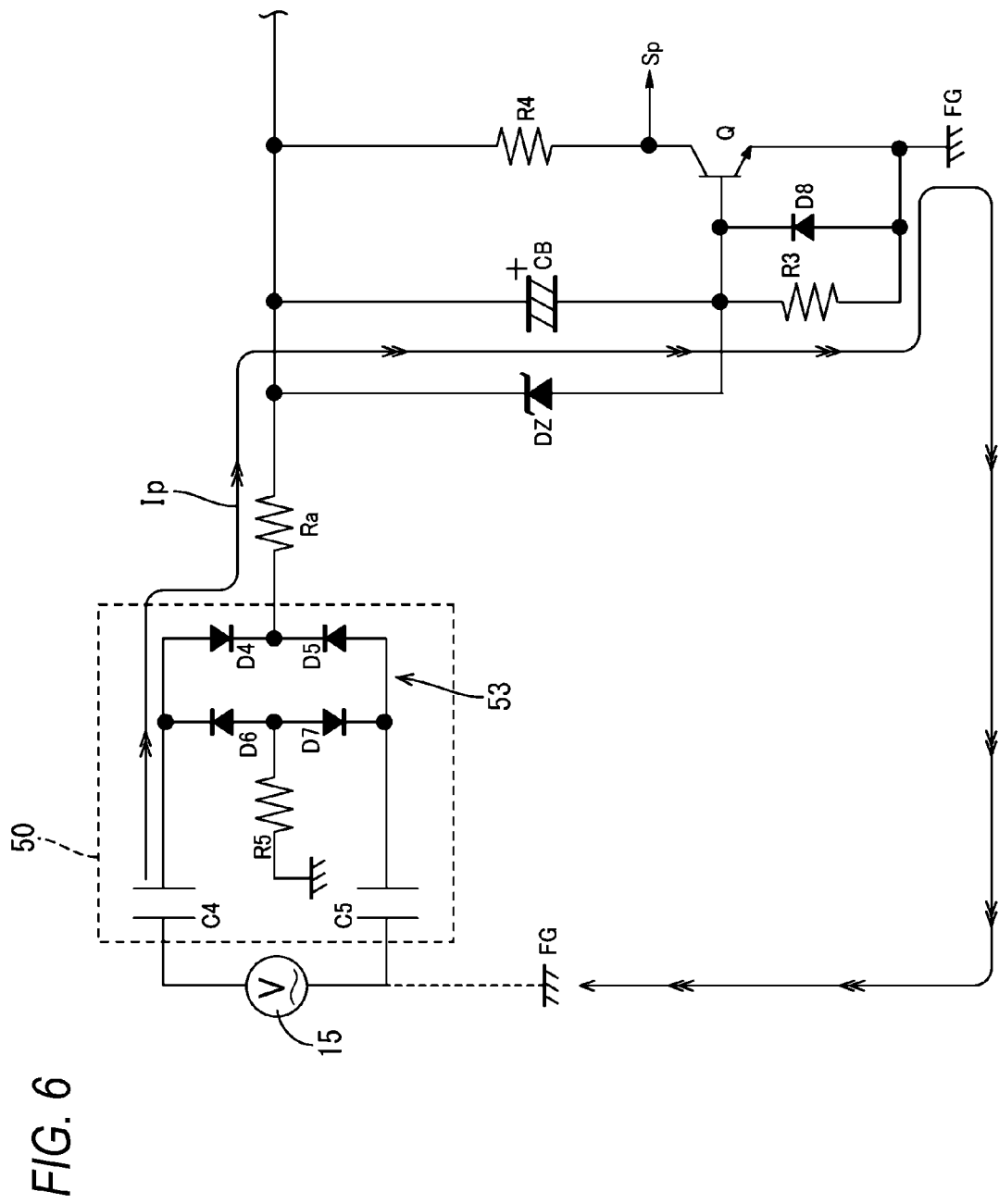
FIG. 6 is a circuit diagram showing a current path of the current Ip when there is a frame ground.
Figure 7:
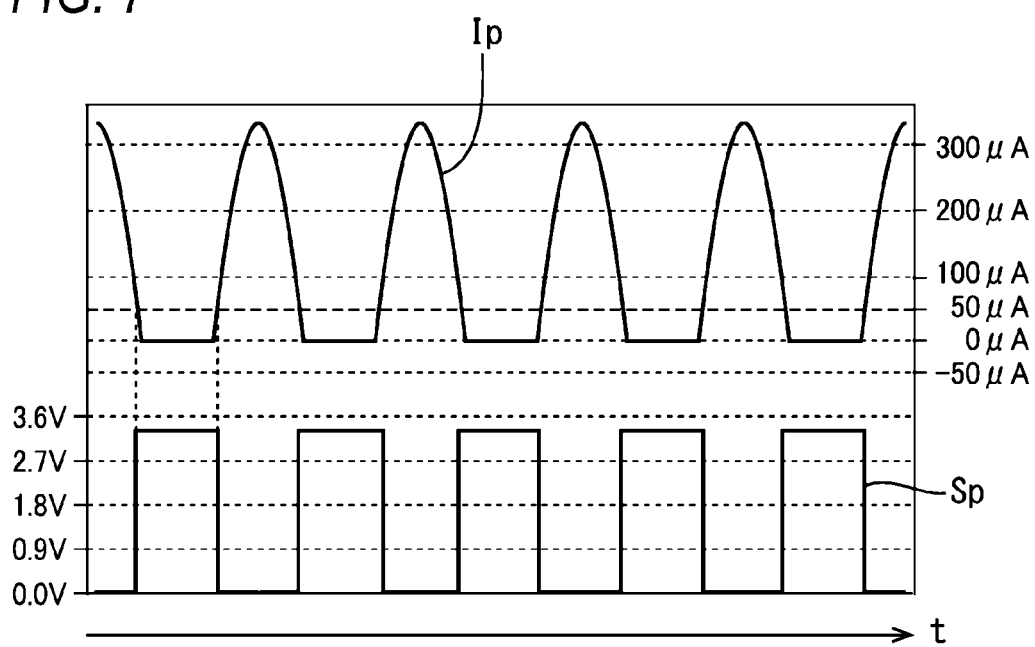
FIG. 7 shows waveforms of the current IP and the pulse signal Sp when there is a frame ground.

The transistor Q becomes on when a voltage between the base and the emitter exceeds a threshold voltage and becomes off when the voltage between the base and the emitter becomes smaller than the threshold voltage. The voltage between the base and the emitter is changed in accordance with current Ip having a rectified waveform and flowing through the resistance R3 via the rectification circuit 53 at the AC power supply 15-side, and becomes off (is on during the other time period) during a time period for which the current Ip is smaller than a reference value, as shown in FIG. 5 or 7.

For this reason, the output of the pulse signal output circuit 60, i.e., the output (a potential of the collector) of the transistor Q becomes the pulse signal Sp corresponding to the power supply frequency of the AC power supply 15. In this way, 'the pulse signal output circuit 60 of the invention is switched between the on state and the off state in accordance with the value of the current (in this example, the current Ip having the rectified waveform) output from the bridge-type rectification circuit 53, so that a circuit including the switching element (in this example, the transistor Q) outputting the pulse signal Sp having a frequency corresponding to the power supply frequency of the AC power supply 15 is implemented.'

The output line (the output line drawn out from the collector of the transistor Q) of the pulse signal output circuit 60 is connected to an input port P3 of a relay control block B2 of the control device 100, so that the pulse signal Sp output from the pulse signal output circuit 60 is input to the relay control block B2.

Incidentally, the reference potential SG (signal ground) of the secondary-side circuit (the auxiliary power supply circuit 50, the pulse signal output circuit 60, the voltage detection circuit 70, the relay driving circuit 80, the control device 100 and the like) is electrically connected to a metal frame (housing) configuring the printer 1. If the metal frame (not shown) is not grounded (hereinafter, there is no frame ground), the current Ip flowing from the AC power supply 15 to the auxiliary power supply circuit 50 flows along a path shown in FIG. 4, i.e., a path of the AC power supply 15→the capacitor C4→the diode D4→the detection resistance Ra→the capacitor CB or zener diode Dz→the resistance R3→the resistance R5→the diode D7→the capacitor C5→the AC power supply 15 when the AC power supply 15 is a positive half wave, and flows a path of the AC power supply 15→the capacitor C5→the diode D5→the detection resistance Ra→the capacitor CB or zener diode Dz→the resistance R3→the resistance R5→the diode D6→the capacitor C4→the AC power supply 15 when the AC power supply 15 is a negative half wave. Therefore, a full wave rectification waveform is obtained. For this reason, as shown in FIG. 5, the frequency of the pulse signal Sp output from the pulse signal output circuit 60 becomes a double frequency of the power supply frequency. In this case, since the current Ip flows via both the coupling capacitors C5, C6, a circuit impedance is high and the current value becomes small.

On the other hand, if the metal frame is grounded (hereinafter, there is a frame ground), the above-described secondary-side circuit is grounded via the frame ground (FG). Therefore, in a case where there is the frame ground, the current Ip flowing from the AC power supply 15 to the auxiliary power supply circuit 50 flows along a path of FIG. 6, i.e., a path of the AC power supply 15→the capacitor C4→the diode D4→the detection resistance Ra→the capacitor CB or zener diode Dz→the resistance R3→the AC power supply 15 only when the AC power supply 15 is a positive half period. For this reason, when there is a frame ground, as shown in FIG. 7, the frequency of the pulse signal Sp output from the pulse signal output circuit 60 is the same as the power supply frequency. In this case, since the current Ip flows only via the coupling capacitor C4, the circuit impedance is low and an amount of the current Ip becomes approximately twice as compared to the case where there is no frame ground. Incidentally, whether or not to ground the printer 1 may be determined by the user.

The voltage detection circuit 70 detects the voltage of the AC power supply 15 and has the detection resistance Ra and a processing circuit 75, as shown in FIG. 3. The detection resistance Ra is provided on the output line Lo4 of the rectification circuit 53 and generates a voltage corresponding to the current I output from the auxiliary power supply circuit 50, as shown in FIG. 3. Incidentally, the processing circuit 75 is an example of the 'detection circuit' of the invention.

The processing circuit 75 has a subtraction circuit 76, an amplification circuit 77 and a peak hold circuit 78. The processing circuit 75 is input with respective voltages of both ends of the detection resistance Ra through the two input lines, i.e., a voltage of a point a shown in FIG. 3 and a voltage of a point b shown in FIG. 3. The subtraction circuit 76 calculates a voltage Vab between both ends of the detection resistance Ra by subtracting the voltage of the point b from the voltage of the point a.

The voltage Vab between both ends, which is calculated by the subtraction circuit 76, is amplified (four times, in this example) by the amplification circuit and is then input to the peak hold circuit 78. The peak hold circuit 78 detects a peak value Vp of the voltage Vab between both ends after the amplification. The output line of the voltage detection circuit 70 is connected to an input port P4 of the relay control block B2 of the control device 100, so that the peak value Vp of the voltage Vab between both ends of the detection resistance Ra is input to the relay control block B2.

The relay driving circuit 80 is a circuit that drives (energization-controls) the driving coil 43. The relay driving circuit 80 has two PNP transistors Tr1, Tr2 and two NPN transistors Tr3, Tr4.

As shown in FIG. 3, the transistor Tr1 and the transistor Tr2 have emitters that are commonly connected to the backup capacitor CB. On the other hand, the transistor Tr3 and the transistor Tr4 have emitters that are commonly connected to the reference potential SG of the secondary-side circuit. Collectors of the transistor Tr1 and the transistor Tr3 are connected to each other and collectors of the transistor Tr2 and the transistor Tr4 are connected to each other.

Also, connection lines are respectively drawn out from a connection point of the transistor Tr1 and the transistor Tr3 and a connection point of the transistor Tr2 and the transistor Tr4, and the connection point of the transistor Tr1 and the transistor Tr3 is connected to one side of the driving coil 43 of the relay 40 through the connection line and the connection point of the transistor Tr2 and the transistor Tr4 is connected to the other side of the driving coil 43. Among the four transistors Tr1, Tr2, Tr3, Tr4, the transistor Tr1 and the transistor Tr4 configures one set and the transistor Tr2 and the transistor Tr3 configures one set.

When a driving signal (an on signal) is sent from the relay control block B2 of the control device 100 to the relay driving circuit 80, the on and off of the relay 40 can be switched. That is, when the driving signal (an on signal) is output from a control port P5 of the relay control block B2, the transistor Tr1 and the transistor Tr4 become on and the current flows from the backup capacitor CB to the driving coil 43 in the A direction shown in FIG. 3. Thereby, the fixed contact point 41a is closed and the relay 40 becomes on (the power supply line of the live LV-side is closed).

On the other hand, when the driving signal (an on signal) is output from a control port P6 of the relay control block B2, the transistor Tr2 and the transistor Tr3 become on and the current flows from the backup capacitor CB to the driving coil 43 in the B direction shown in FIG. 3. Thereby, the fixed contact point 41b is closed and the relay 40 becomes off (the power supply line of the live LV-side is opened). Incidentally, since the relay driving circuit 80 is connected to the output line Lo2 of 5V through the diode D9, when the switching power supply 20 is operating, the relay driving circuit 80 can operate by using the switching power supply 20 as a power supply. Also, in this illustrative embodiment, since a latching relay is used as the relay 40, it is possible to configure the driving signal by the pulse signal.

The control device 100 has a main block B1 that controls the printing unit 2 of the printer 1, and the relay control block B2. The respective blocks B1, B2 can be configured by any one of one or more CPUs, a hardware circuit such as an ASIC and a combination of a CPU and a hardware circuit.

A power supply port P1 of the main block B1 is connected to the output line Lo3 of the DC-DC converter 37 and is fed with the power from the switching power supply 20 through the DC-DC converter 37. Incidentally, the main block B1 is fed with the power and thus operates only in an output mode where the switching power supply 20 is at an output state, and when the switching power supply 20 stops the output, the power feed is interrupted, so that the main block B1 is at a stop.

The relay control block B2 switches the relay 40 through the relay driving circuit 80. As described above, the relay control block B2 is provided with the two control ports P5, P6. When the driving signal is output from the control port P5, the relay control block B2 can turn on the relay 40 (closes the fixed contact point 41a), and when the driving signal is output from the control port P6, the relay control block B2 can turn off the relay 40 (closes the fixed contact point 41b). Incidentally, since the relay control block B2 uses the backup capacitor CB as a power supply, the relay control block B2 can operate when the backup capacitor CB is charged, even though the switching power supply 20 stops the output.

3. Protection of Switching Power Supply 20

In order to protect the switching power supply 20, it is preferable that an overvoltage not be applied to the respective electronic components such as the smoothing capacitor C1 provided at the primary-side. In the power supply system S, when starting up the switching power supply 20, the relay 40 is beforehand off, so that the switching power supply 20 is cut off from the AC power supply 15.

Then, based on the detection value (in this example, the peak value Vp of the voltage Vab between both ends of the detection resistance Ra) of the voltage detection circuit 70, it is determined whether the AC input voltage from the AC power supply 15 is an overvoltage or not (one example of an overvoltage detection process). When an overvoltage is not detected, the relay 40 becomes on, so that the switching power supply 20 is connected to the AC power supply 15 and the switching power supply 20 is thus operated.

On the other hand, when an overvoltage is detected, the relay 40 is kept at the off state and the switching power supply 20 is kept at the cutoff state from the AC power supply 15. Then, at the time that the overvoltage is not detected, the relay 40 is shifted to the on state, so that the switching power supply 20 is connected to the AC power supply 15 and the switching power supply 20 is thus operated. In this way, the switching power supply 20 is not applied with the overvoltage, so that the switching power supply 20 can be protected from the overvoltage.

Also, as described above, since the circuit impedance is changed depending on whether there is the frame ground, a magnitude of the current flowing through the detection resistance Ra of the voltage detection circuit 70 is changed even though the AC input voltage (the power supply voltage of the AC power supply 15) is the same. For this reason, when a threshold for determining the overvoltage is fixed, it is possible to correctly determine whether the AC input voltage is an overvoltage. Also, likewise, when the power supply frequency of the AC power supply 15 is different, the circuit impedance is changed. Therefore, the magnitude of the current flowing through the detection resistance Ra of the voltage detection circuit 70 is changed even though the AC input voltage (the power supply voltage of the AC power supply) is the same. For this reason, when a threshold for determining the overvoltage is fixed, it is possible to correctly determine whether the AC input voltage is an overvoltage.

Figure 9:
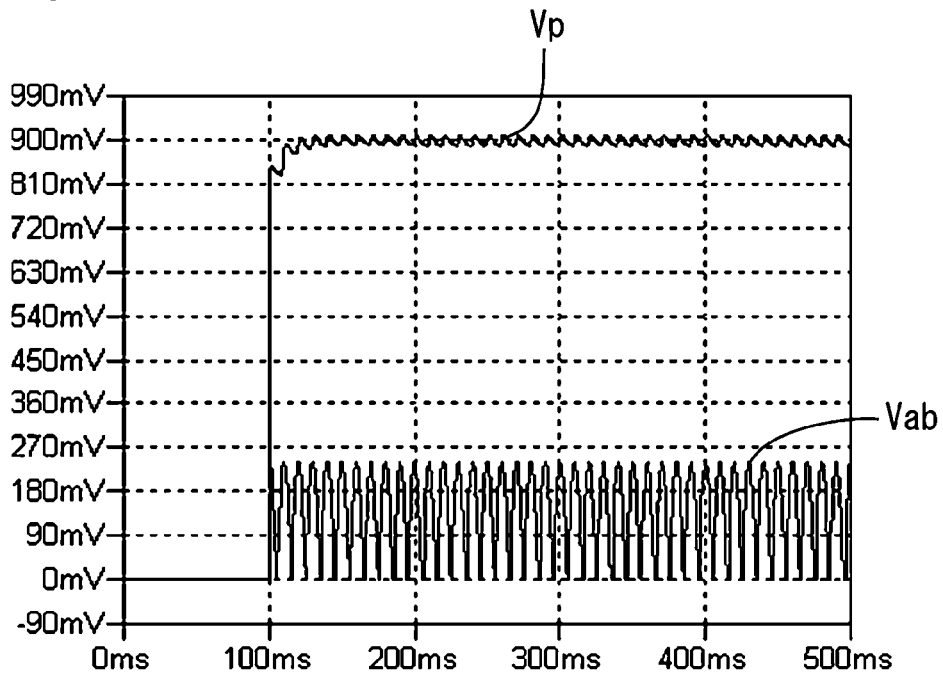
FIG. 9 is a graph showing a temporal change of a peak value Vp when there is no frame ground and a power supply frequency is 50 Hz.

Therefore, in this illustrative embodiment, the threshold for determining whether the AC input voltage is an overvoltage is changed depending on the frequency of the pulse signal Sp that is output from the pulse signal output circuit 60. Specifically, in a circuit example of the power supply device 10, as shown in FIG. 8, in the case of a condition A, when the power supply voltage of the AC power supply 15 is a normal value (100[V]), the peak voltage Vp that is output from the voltage detection circuit 70 is 0.9[V], as shown in FIG. 9. For this reason, in the case of the condition A (the frequency of the pulse signal Sp is 100 Hz), the threshold is set to be 1.5[V].

Figure 10:
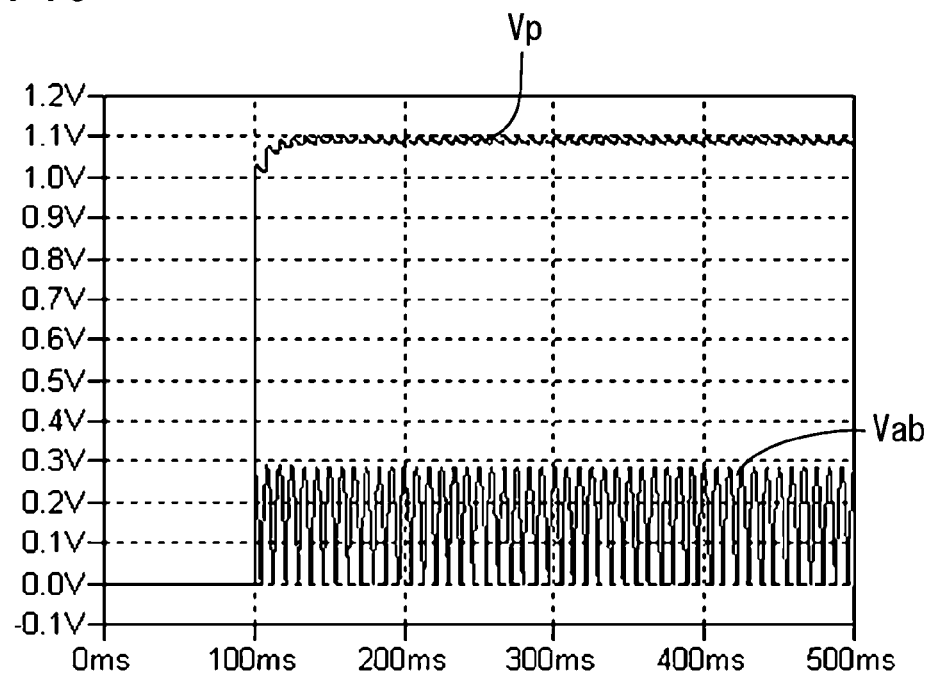
FIG. 10 is a graph showing a temporal change of the peak value Vp when there is no frame ground and the power supply frequency is 60 Hz.

Also, in the case of a condition B, when the power supply voltage of the AC power supply 15 is a normal value (100[V]), the peak voltage Vp that is output from the voltage detection circuit 70 is 1.1[V], as shown in FIG. 10. For this reason, in the case of the condition B (the frequency of the pulse signal Sp is 120 Hz), the threshold is set to be 1.6[V].

Figure 11:
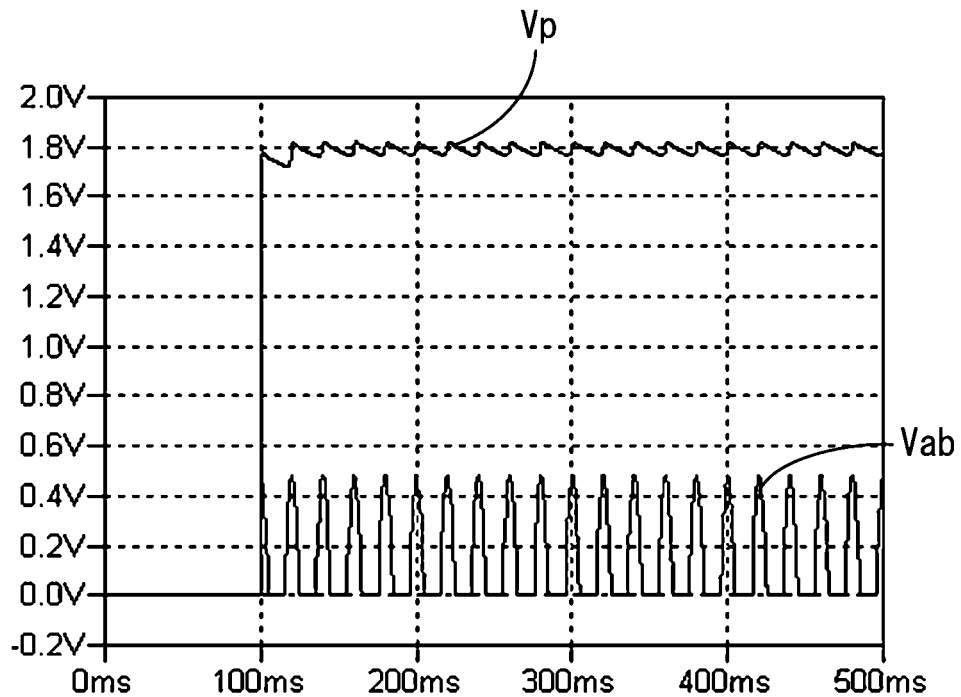
FIG. 11 is a graph showing a temporal change of the peak value Vp when there is a frame ground and the power supply frequency is 50 Hz.

Also, in the case of a condition C, when the power supply voltage of the AC power supply 15 is a normal value (100[V]), the peak voltage Vp that is output from the voltage detection circuit 70 is 1.8[V], as shown in FIG. 11. For this reason, in the case of the condition C (the frequency of the pulse signal Sp is 50 Hz), the threshold is set to be 3[V].

Figure 12:
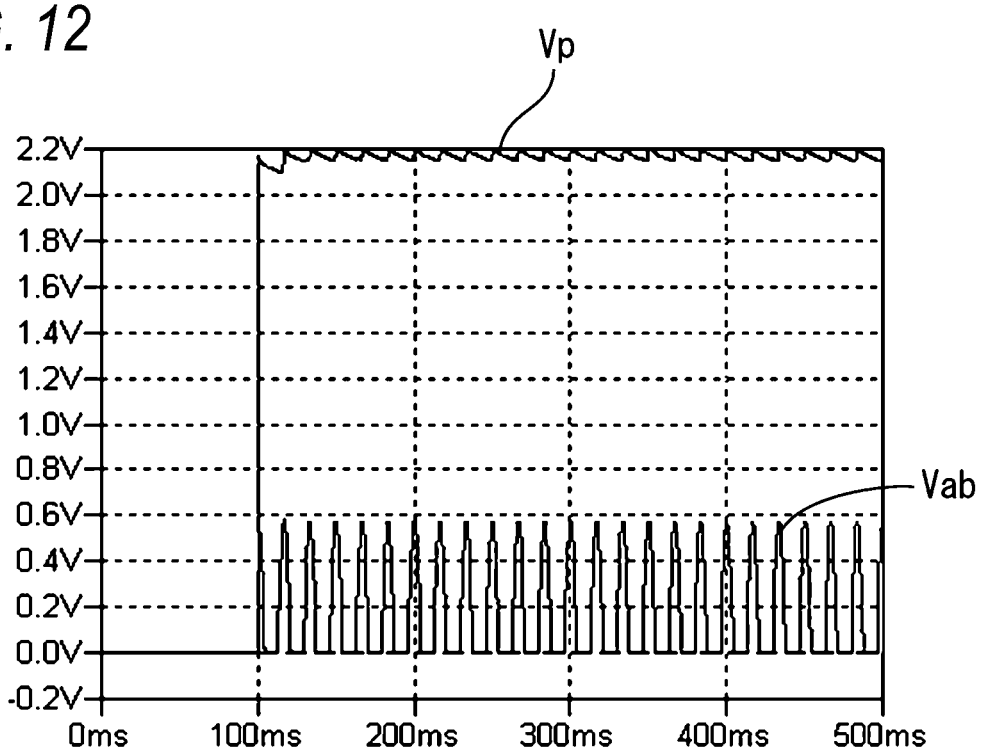
FIG. 12 is a graph showing a temporal change of the peak value Vp when there is a frame ground and the power supply frequency is 60 Hz.

Also, in the case of a condition D, when the power supply voltage of the AC power supply 15 is a normal value (100[V]), the peak voltage Vp that is output from the voltage detection circuit 70 is 2.2[V], as shown in FIG. 12. For this reason, in the case of the condition D (the frequency of the pulse signal Sp is 60 Hz), the threshold is set to be 3.2[V].

Here, the conditions A to D are as follows.

The condition A is a case where there is no frame ground and the power supply frequency of the AC power supply 15 is 50 Hz.

The condition B is a case where there is no frame ground and the power supply frequency of the AC power supply 15 is 60 Hz.

The condition C is a case where there is the frame ground and the power supply frequency of the AC power supply 15 is 50 Hz.

The condition D is a case where there is the frame ground and the power supply frequency of the AC power supply 15 is 60 Hz.

The circuit constants are as follows.

Capacitances of the capacitors C4, C5 are 3,300 [pF], forward voltage drops of the diodes D4 to D6 are 0.6 [V], resistance values of the resistance Ra and the resistance R5 are 3.3 [kΩ], a resistance value of the resistance R3 is 470 [kΩ], a resistance value of the resistance R4 is 4.7 [MΩ (megaohm)], a capacitance of the capacitor CB is 680 [μF] and a zener voltage of the zener diode Dz is 5.6 [V].

In the printer 1, a correspondence table shown in FIG. 8, i.e., a correspondence table in which the frequency of the pulse signal Sp, which is output from the pulse signal output circuit 60, and the threshold are associated with each other, is beforehand stored in the relay control block B2 and the like and the threshold for determining whether the AC input voltage is an overvoltage is changed in correspondence to the frequency of the pulse signal Sp. For this reason, it is possible to correctly determine whether the AC input voltage is an overvoltage, irrespective of a difference of the power supply frequency of the AC power supply 15. Also, it is possible to correctly determine whether the AC input voltage is an overvoltage, irrespective of whether there is the frame ground.

Incidentally, when the power supply frequency of the AC power supply 15 is two types of 50 Hz and 60 Hz, the basic frequency of the pulse signal Sp is two patterns of 50 Hz and 60 Hz. That is, 100 Hz is a double frequency of the basic frequency 50 Hz and 120 Hz is a double frequency of the basic frequency 60 Hz. For this reason, as described above, to set the thresholds for each of the four patterns of 50 Hz, 60 Hz, 100 Hz and 120 Hz means that the threshold is set for each basic frequency and the threshold is set depending on a frequency ratio to the basic frequency (the power supply frequency of the AC power supply).

4. Protection Sequence of Switching Power Supply

Figure 13:
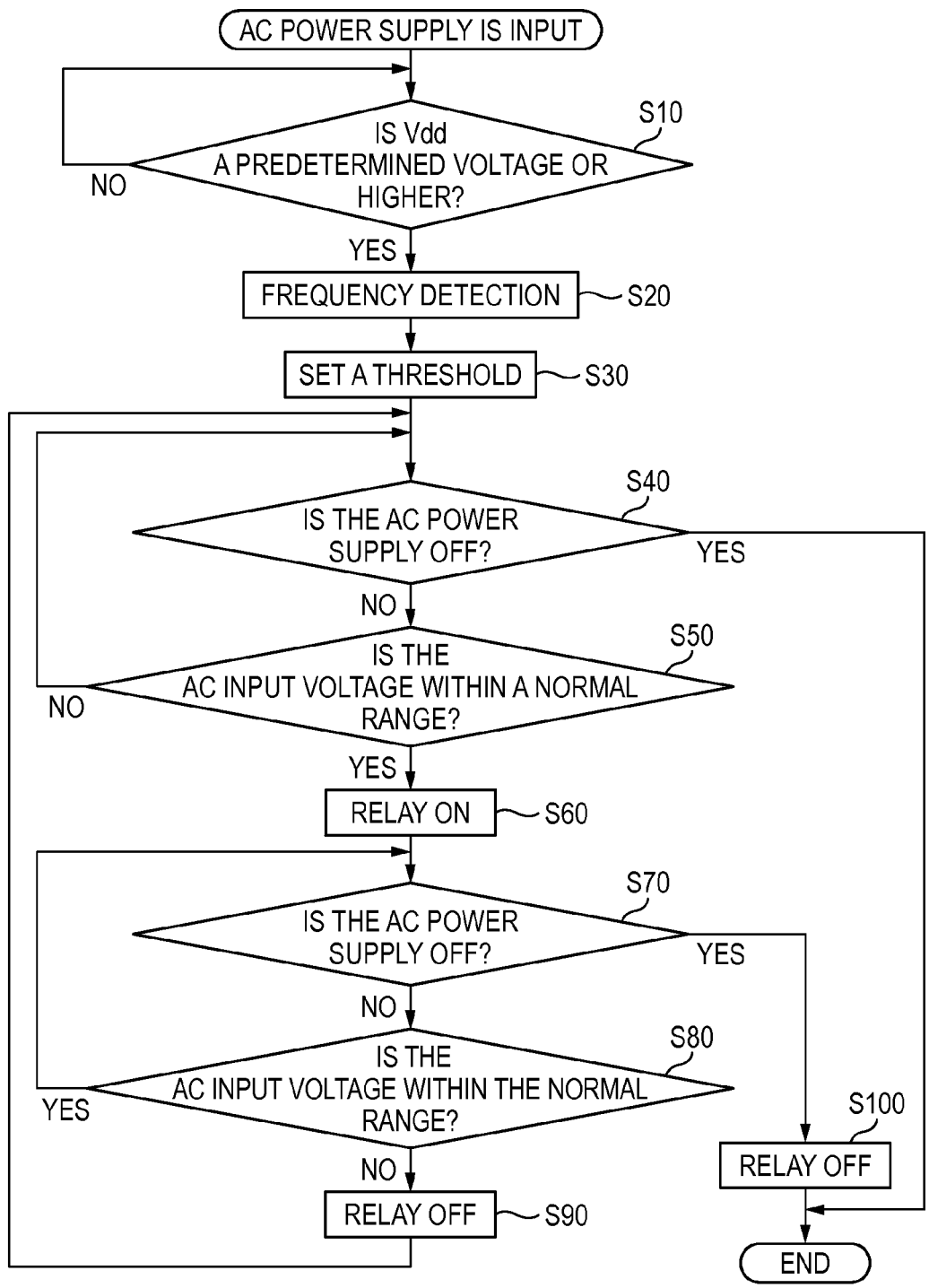
FIG. 13 is a flowchart showing a protection sequence of a switching power supply.

In the below, a protection sequence of the switching power supply 20 that is executed by the control device 100 is described with reference to FIG. 13. Incidentally, the protection sequence of the switching power supply 20 starts when the power supply cable is connected to an AC outlet and the AC power supply 15 is thus input. Also, it is assumed that the relay 40 is at the off state and the switching power supply 20 is disconnected from the AC power supply 15 at the time that the AC power supply 15 is input.

After the AC power supply 15 is input, the charging current flows through the backup capacitor CB via the auxiliary power supply circuit 50. For this reason, the voltage of the backup capacitor CB is increased. Thereby, a line voltage (hereinafter, a power supply voltage Vdd) of the output line Lo4 is increased. Then, when the power supply voltage Vdd exceeds a minimum operating voltage, the relay control block B2 starts up (starts up using the backup capacitor CB as a power supply).

After the startup, the relay control block B2 compares the power supply voltage Vdd and a predetermined voltage to thus determine whether the power supply voltage Vdd is the predetermined voltage or higher (S10). Incidentally, the predetermined voltage is a voltage at which the respective circuits 60, 70, 80 normally operate by using the backup capacitor CB as a power supply, and is 3.3V, for example.

When the power supply voltage Vdd is the predetermined voltage or lower (NO in S10), the processing of S10 is again executed. Therefore, a standby state of waiting for the power supply voltage Vdd to exceed the predetermined voltage while monitoring the power supply voltage Vdd is made.

When the AC power supply 15 is input, the backup capacitor CB is charged as time goes by, so that the power supply voltage Vdd exceeds the predetermined voltage. Then, 'YES' is determined in the processing of S10 and the processing shifts to S20.

After the processing shifts to S20, the relay control block B2 monitors an input of the input port P3 and detects the frequency of the pulse signal Sp that is output from the pulse signal output circuit 60. After that, the processing shifts to S30. In S30, a threshold for determining an overvoltage of the AC power supply 15 is set by the relay control block B2. Specifically, regarding the frequency of the pulse signal Sp detected in S20, a threshold corresponding to the frequency of the pulse signal Sp is selected and set with reference to the correspondence table shown in FIG. 8. For example, when the frequency detected in S20 is 100 Hz, the threshold is set to be 1.5 [V].

When the processing of S30 is over, the processing shifts to S40 and the relay control block B2 determines whether the AC power supply is off or not. When the AC power supply is not off (the AC power supply is off when the power supply cable is unplugged, for example), the pulse signal Sp is input to the input port P3 of the relay control block B2 at a predetermined period. On the other hand, when the AC power supply 15 is off, the pulse signal Sp is not input. For this reason, the relay control block B2 can determine whether the AC power supply is off or not by detecting whether the pulse signal Sp is input at a predetermined period.

When the AC power supply 15 is not off (S40: NO), the processing shifts to S50 and the relay control block B2 compares the peak voltage Vp, which is output from the voltage detection circuit 70, and the threshold set in S30 to thereby determine whether the AC input voltage from the AC power supply 15 is within a normal range. That is, when the peak voltage Vp is lower than the threshold, it is determined that the AC input voltage is within the normal range. On the other hand, when the peak voltage Vp is the threshold or higher, it is determined that the AC input voltage is an overvoltage. Incidentally, the 'overvoltage detection process' of the invention is implemented by the processing of S50 that is executed by the relay control block B2.

When it is determined that the AC input voltage is within the normal range, the processing shifts to S60 and a driving signal is output from the control port P5 of the relay control block B2 to the relay driving circuit 80. Thereby, the forward current flows through the driving coil 43 via the relay driving circuit 80 and the relay 40 becomes on. Thereby, the switching power supply 20 is connected to the AC power supply 15 and then starts up.

On the other hand, when it is determined that the AC input voltage is an overvoltage, the processing again shifts to S40 and it is determined whether the AC power supply is off. When the AC power supply 15 is not off, the processing shifts to S50 and it is determined whether the AC input voltage from the AC power supply 15 is within the normal range. For this reason, when the AC input voltage is abnormal (overvoltage), the processing of S40 and S50 is repeated. During the repetition, the relay 40 is kept at the off state by the relay control block B2. That is, since the relay control block B2 does not output the driving signal turning on the relay 40 and keeps the relay 40 at the off state, it is possible to prevent the overvoltage from being applied to the switching power supply 20 from the AC power supply 15.

Incidentally, the processing of S40 and S50 that is executed by the relay control block B2, i.e., the processing of repeatedly executing the processing of S40 and S50 not to thus turn on the relay until the overvoltage is not detected implements the 'process of keeping the switching unit at a cutoff state where the AC power supply and the switching power supply are disconnected, when an overvoltage is detected in the overvoltage detection process'.

When the AC input voltage from the AC power supply 15 is returned to the normal, the determination result of S50 is YES and the processing shifts to S60. When the processing shifts to S60, a driving signal is output from the control port P5 of the relay control block B2 to the relay driving circuit 80, as described above. Thereby, the forward current flows through the driving coil 43 via the relay driving circuit 80 and the relay 40 becomes on. For this reason, the switching power supply 20 is connected to the AC power supply 15 and then starts up.

After the processing of S60, the processing shifts to S70 and the relay control block B2 determines whether the AC power supply is off or not. When the AC power supply 15 is not off (S70: NO), the processing shifts to S80.

When the processing shifts to S80, the relay control block B2 compares the peak voltage Vp, which is output from the voltage detection circuit 70, and the threshold set in S30 to thereby determine whether the AC input voltage from the AC power supply 15 is within the normal range, like the processing of S50.

When it is determined that the AC input voltage is within the normal range, the processing shifts to S70 and it is determined whether the AC power supply is off or not. When the AC power supply 15 is not off, the processing shifts to S80. For this reason, when the AC input voltage is normal, the processing of S70 and S80 is repeated. During the repetition, the relay 40 is kept at the on state by the relay control block B2.

When the AC input voltage becomes an overvoltage, a result of the determination in S80 is NO. When a result of the determination in S80 is NO, the processing shifts to S90. In S90, a driving signal is output from the control port P6 of the relay control block B2 to the relay driving circuit 80. Thereby, the reverse current flows through the driving coil 43 via the relay driving circuit 80 and the relay 40 becomes off. For this reason, the switching power supply 20 is disconnected from the AC power supply 15. Therefore, it is possible to protect the switching power supply 20 from the overvoltage.

After the processing of S90, the processing returns to S40. Thus, the relay control block B2 monitors the AC input voltage while keeping the relay 40 at the off state. When the AC input voltage returns to the normal range, the relay control block B2 again turns on the relay 40 and connects the switching power supply 20 to the AC power supply 15 (S60). The processing is repeated, so that only when the AC input voltage is within the normal range during the execution of the protection sequence, the switching power supply 20 is connected to the AC power supply 15, and when the AC input voltage is abnormal (overvoltage), the switching power supply 20 is disconnected from the AC power supply 15.

The protection sequence of the switching power supply 20 is over when the AC power supply 15 is off because the power supply cable is unplugged, for example. That is, when the AC power supply 15 is off at the state where the relay 40 is off, a result of the determination in S40 is NO and the series of processing is over. Also, when the AC power supply 15 is off at the state where the relay 40 is on, the relay 40 becomes off in S100 and then the series of processing is over.

As described above, when the protection sequence is over, the relay 40 becomes off. For this reason, when a next protection sequence is executed as the AC power supply 15 is input, the relay 40 becomes off and the switching power supply 20 is not connected to the AC power supply 15 until the relay control block B2 determines that the AC input voltage is normal.

5. Advantages

In the power supply system S, when starting up the switching power supply 20, the relay 40 is turned off in advance to disconnect the switching power supply 20 from the AC power supply 15. Then, based on the detection value (in this example, the peak value Vp of the voltage Vab between both ends of the detection resistance Ra) of the voltage detection circuit 70, it is detected whether the AC input voltage from the AC power supply 15 is an overvoltage or not. When an overvoltage is not detected, the relay 40 is shifted to the on state, so that the switching power supply 20 is connected to the AC power supply 15 and thus the switching power supply 20 starts up.

On the other hand, when an overvoltage is detected, the relay 40 is kept at the off state and the switching power supply 20 is kept being disconnected from the AC power supply 15. At the time that the overvoltage is not detected, the relay 40 is shifted to the on state, so that the switching power supply 20 is connected to the AC power supply 15 and thus the switching power supply 20 starts up. In this way, the overvoltage is not applied to the switching power supply 20, so that the switching power supply 20 can be protected from the overvoltage.

Also, in the power supply system, the auxiliary power supply circuit 50 is configured by the pair of coupling capacitors C4, C5 and the bridge-type rectification circuit 53 and thus the auxiliary power supply circuit 50 has a relatively simple configuration. Also, the voltage detection circuit 70 is configured by the detection resistance Ra and the processing circuit 75 and thus has a simple configuration, which has a cost merit. Also, the voltage is detected in the peak hold circuit 78. For this reason, compared to a configuration of calculating an average of the voltages, it is possible to detect the AC input voltage from the AC power supply in a short time.

Second Illustrative Embodiment

Figure 14:
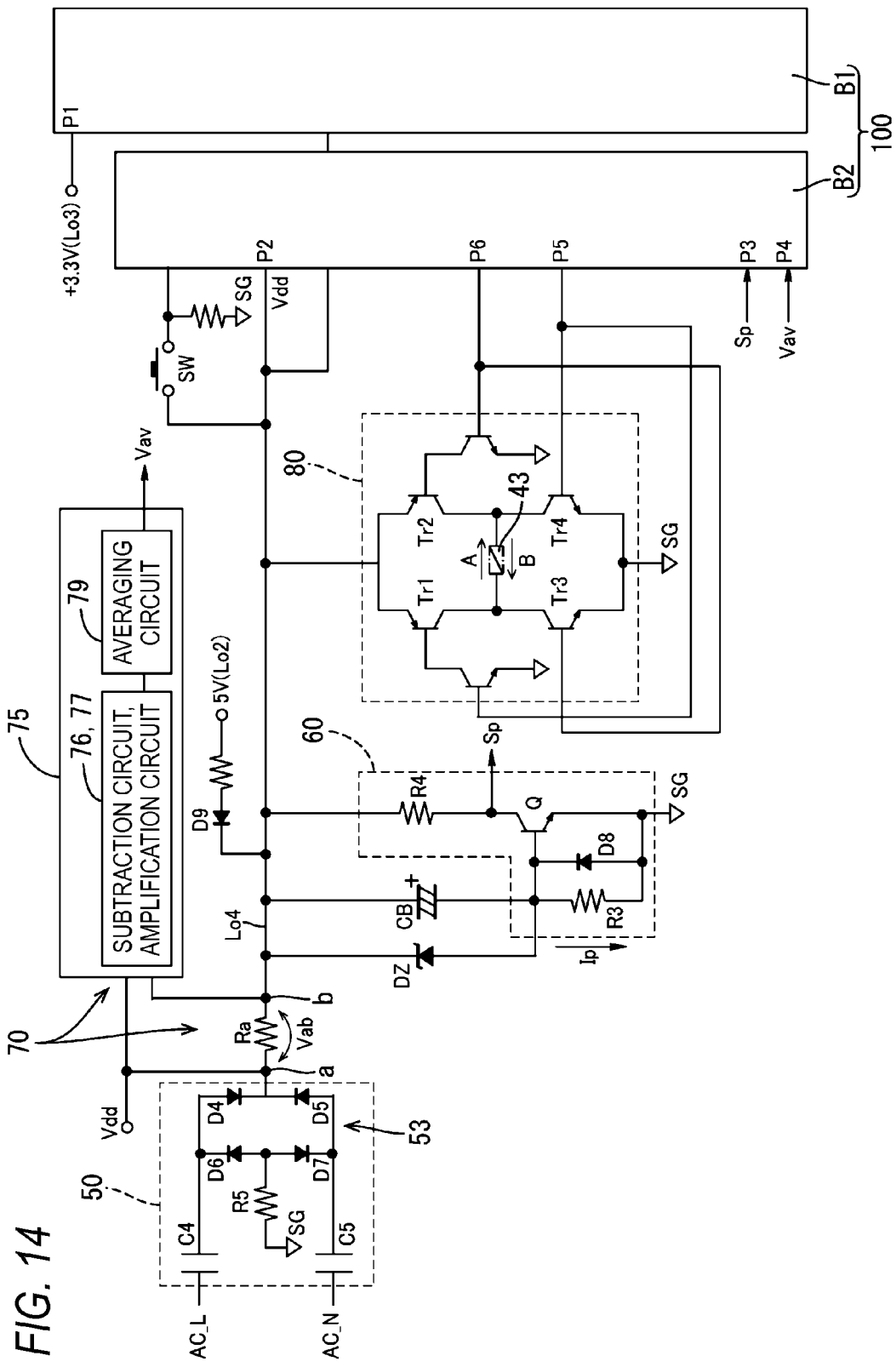
FIG. 14 is a circuit diagram of a power supply device according to a second illustrative embodiment, which shows the auxiliary power supply circuit-side.

In the below, a second illustrative embodiment of the invention will be described with reference to FIG. 14.

In the first illustrative embodiment, the voltage detection circuit 70 is configured by the detection resistance Ra and the processing circuit 75. The processing circuit 75 is configured by the subtraction circuit 76, the amplification circuit 77 and the peak hold circuit 78 and detects the peak value Vp of the voltage Vab between both ends of the detection resistance Ra. In the second illustrative embodiment, the peak hold circuit 78 is changed to an averaging circuit 79 to thus detect an average value Vav of the voltage Vab between both ends of the detection resistance Ra. Since the average value Vav is less influenced by a noise than the peak value Vp, it is possible to correctly determine whether the AC input voltage from the AC power supply 15 is an overvoltage or not.

Third Illustrative Embodiment

Figure 15:
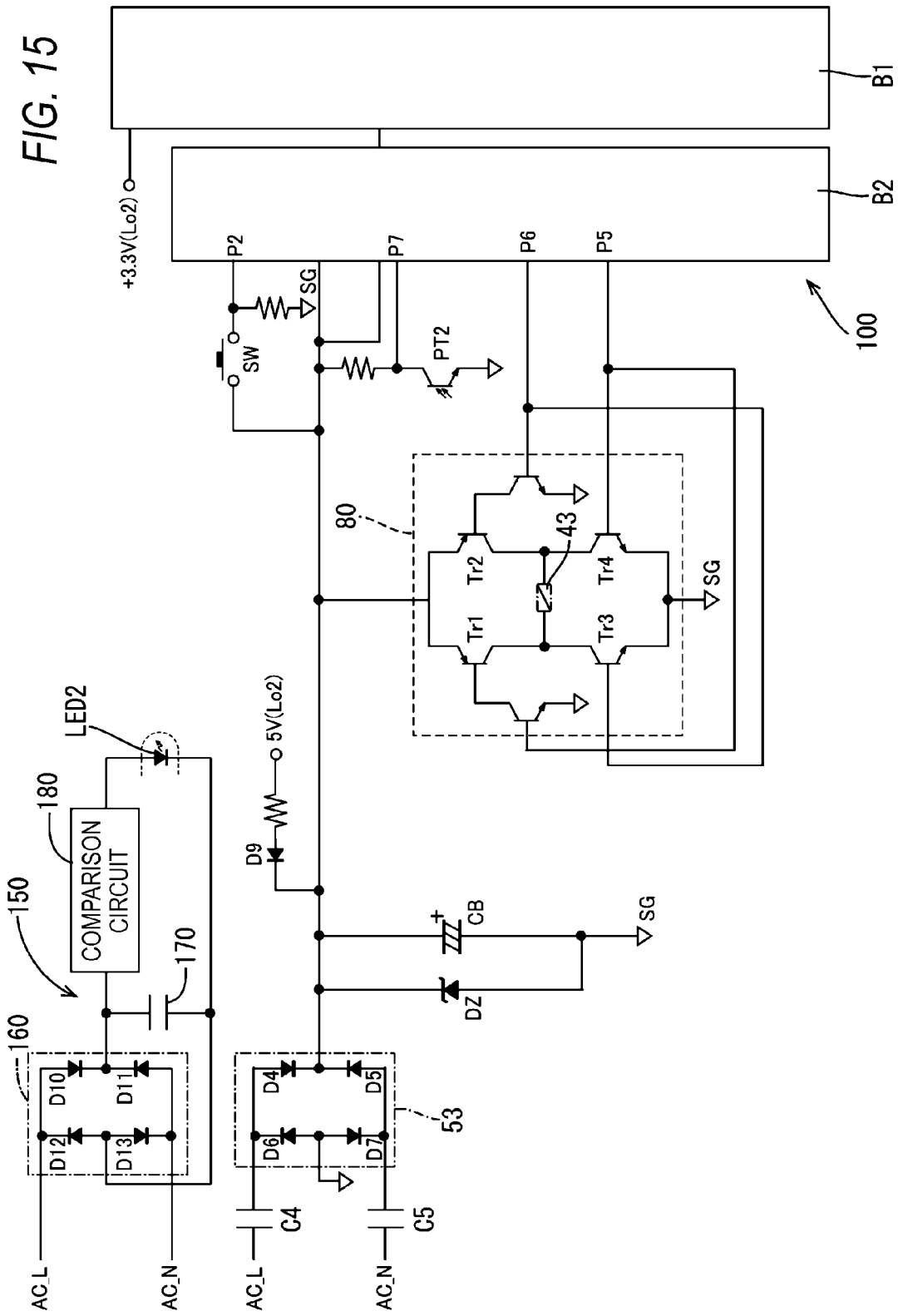
FIG. 15 is a circuit diagram of a power supply device according to a third illustrative embodiment, which shows the auxiliary power supply circuit-side.

In the below, a third illustrative embodiment of the invention will be described with reference to FIG. 15.

In the first illustrative embodiment, the voltage detection circuit 70 is configured by the detection resistance Ra and the processing circuit 75 and the voltage Vab between both ends of the detection resistance Ra is measured to detect the voltage of the AC power supply 15.

In the third illustrative embodiment, the configuration of the voltage detection circuit 70 of the first illustrative embodiment is changed. In the third illustrative embodiment, a voltage detection circuit 150 is configured by a bridge-type rectification circuit (four bridge-connected diodes D10 to D13) 160, a capacitor 170 and a comparison circuit 180. The bridge-type rectification circuit 160 is connected to the AC power supply 15 and rectifies the AC voltage of the AC power supply 15 and the charging current flows from the bridge-type rectification circuit 160 to the capacitor 170. The comparison circuit 180 compares a voltage of the capacitor 170 with a threshold voltage and turns on a light emitting diode LED2 when the voltage of the capacitor 170 exceeds the threshold voltage.

The light emitting diode LED2 configures a photo-coupler together with a photo transistor PT2 connected to a detection port P7 of the relay control block B2. Hence, when the light emitting diode LED2 is turned on, the photo transistor PT2 becomes on (becomes electrically conductive) and a level of the detection port P7 becomes a low level. On the other hand, when the light emitting diode LED2 is not turned on, the photo transistor PT2 becomes off (is not electrically conductive), so that a level of the detection port P7 becomes a high level.

When the voltage of the AC power supply 15 is within the normal range, the voltage of the capacitor 170 is smaller than the threshold, so that the light emitting diode LED2 is turned off and the level of the detection port P7 becomes a high level. On the other hand, when the voltage of the AC power supply 15 is an overvoltage, the voltage of the capacitor 170 exceeds the threshold, so that the light emitting diode LED2 is turned on and the level of the detection port P7 becomes a low level. Therefore, the relay control block B2 can determine whether the AC input voltage from the AC power supply 15 is an overvoltage or not by monitoring the level of the detection port P7.

Like the first illustrative embodiment, when starting up the switching power supply 20, the relay 40 is turned off in advance to disconnect the switching power supply 20 from the AC power supply 15. Then, by monitoring the level of the detection port P7, the relay control block B2 determines whether the AC input voltage from the AC power supply 15 is an overvoltage or not.

When the overvoltage is detected, the relay control block B2 keeps the relay 40 at the off state and keeps disconnecting the switching power supply 20 from the AC power supply 15. After that, at the time that the overvoltage is not detected, the relay 40 is shifted to the on state, so that the switching power supply 20 is connected to the AC power supply 15 and thus the switching power supply 20 starts up. In this way, the overvoltage is not applied to the switching power supply 20, so that the switching power supply 20 can be protected from the overvoltage.

Incidentally, since the voltage detection circuit 150 determines whether the AC power supply 15 is an overvoltage, based on a charged voltage of the capacitor 170, it is not necessary to switch the threshold, depending on the power supply frequency or whether or not the frame ground. That is, the charged voltage of the capacitor 170 depends on only the voltage of the AC power supply 15 and does not depend on the power supply frequency or whether or not the frame ground. For this reason, in the third illustrative embodiment, the pulse signal output circuit 60 is omitted.

Modifications to Illustrative Embodiments

The invention is not limited to the illustrative embodiments described above and shown in the drawings. Following illustrative embodiments may also be included in the technical scope of the invention.

(1) In the first to third illustrative embodiments, the power supply system S is used for the printer. However, the power supply system can be applied to any electric device and the utility of the power supply system S is not limited to the printer. For example, the power supply system can be widely used for home appliances such as a television, a video recorder and the like. Also, although the electrophotographic printer has been exemplified in the first to third illustrative embodiments, the invention can be also applied to an inkjet printer.

(2) In the first to third illustrative embodiments, the latching relay is used as the relay 40. However, a relay having no latch function may be also used.

(3) In the first to third illustrative embodiments, the backup capacitor CB has been exemplified as the electricity storage unit. However, a secondary battery can be also used.

What is claimed is:
1. A power supply system comprising:
a switching power supply configured to convert an alternating current voltage from an alternating current power supply into a predetermined direct current voltage and to output the direct current voltage;

a switching unit, which is provided between the alternating current power supply and the switching power supply, and which is configured to switch a connection state between the alternating current power supply and the switching power supply;

a control device;

an electricity storage unit configured to feed power to the control device in a case where the switching power supply is at a stop;

an auxiliary power supply circuit, which is connected in parallel with the switching power supply with respect to the alternating current power supply, and which is configured to feed charging current to the electricity storage unit;

a driving circuit configured to drive the switching unit in response to an instruction output from the control device; and a voltage detection circuit configured to detect a voltage of the alternating current power supply, wherein the control device is configured to perform:

an overvoltage detection process of, when starting up the switching power supply, determining whether the alternating current power supply is an overvoltage based on a detection value of the voltage detection circuit; and a process of, in a case where an overvoltage is detected in the overvoltage detection process, keeping the switching unit at a cutoff state where the alternating current power supply and the switching power supply are disconnected.

2. The power supply system according to claim 1, wherein in a case where the overvoltage is not detected while the process of keeping the switching unit at the cutoff state is being executed, the control device is configured to control the driving circuit to switch the switching unit to a connection state where the alternating current power supply and the switching power supply are connected.

3. The power supply system according to claim 1, wherein the auxiliary power supply circuit comprises:

a pair of coupling capacitors; and a bridge-type rectification circuit, which is connected to the alternating current power supply through the pair of coupling capacitors, and which is configured to rectify the alternating current voltage from the alternating current power supply, wherein the auxiliary power supply circuit is configured to supply current, which is output from the bridge-type rectification circuit, to the electricity storage unit as the charging current, wherein the voltage detection circuit comprises:

a detection resistance that generates a voltage corresponding to the current output from the bridge-type rectification circuit; and a detection circuit configured to detect a voltage between both ends of the detection resistance, and wherein the control device is configured to compare the voltage between both ends of the detection resistance, which is detected by the detection circuit, and a threshold so as to determine whether the alternating current power supply is an overvoltage.

4. The power supply system according to claim 3, further comprising:

a pulse signal output circuit configured to output a pulse signal having a frequency corresponding to a power supply frequency of the alternating current power supply, wherein the control device is configured to change a value of the threshold based on the frequency of the pulse signal.

5. The power supply system according to claim 4, wherein the pulse signal output circuit comprises a switching element configured to, by being switched an on/off state thereof depending on a value of the current output from the bridge-type rectification circuit, output the pulse signal having the frequency corresponding to the power supply frequency of the alternating current power supply, and wherein the control device is configured to change the value of the threshold based on comparison of the frequency of the pulse signal and the power supply frequency.

6. The power supply system according to claim 3, wherein the detection circuit comprises a peak hold circuit and is configured to detect a peak value of the voltage between both ends of the detection resistance.

7. The power supply system according to claim 3, wherein the detection circuit comprises an averaging circuit and is configured to detect an average value of the voltage between both ends of the detection resistance.

* * * * *